(12) United States Patent
Monney et al.

(10) Patent No.: US 11,720,991 B2
(45) Date of Patent: Aug. 8, 2023

(54) SIGNING AND AUTHENTICATION OF DIGITAL IMAGES AND OTHER DATA ARRAYS

(71) Applicant: International Business Machines Corporation, Armonk, NY (US)

(72) Inventors: Serge Monney, Pully (CH); Andrea Giovannini, Zurich (CH); Adam Ivankay, Zurich (CH)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 17/326,010

(22) Filed: May 20, 2021

(65) Prior Publication Data

US 2022/0374660 A1   Nov. 24, 2022

(51) Int. Cl.
*G06T 1/00* (2006.01)
*G06N 3/084* (2023.01)
(Continued)

(52) U.S. Cl.
CPC ............ *G06T 1/005* (2013.01); *G06F 18/214* (2023.01); *G06F 18/24* (2023.01); *G06N 3/084* (2013.01);
(Continued)

(58) Field of Classification Search
CPC ....... G06T 1/0021–0092; G06T 7/0002; H04L 9/3247; G06F 18/214; G06F 18/24; G06N 3/084; G06V 20/40
See application file for complete search history.

(56) References Cited

U.S. PATENT DOCUMENTS

| 9,519,942 B2 | 12/2016 | Soborski |
| 10,325,084 B1 | 6/2019 | Larimer |

(Continued)

FOREIGN PATENT DOCUMENTS

| CN | 109829306 A | 5/2019 |
| CN | 110264223 A | 9/2019 |

(Continued)

OTHER PUBLICATIONS

Huang et al, "Digital Watermarking Based on Neural Network and Image Features" (published in 2009 Second International Conference on Information and Computing Science, pp. 237-240) (Year: 2009).*

(Continued)

*Primary Examiner* — Casey L Kretzer
(74) *Attorney, Agent, or Firm* — Grant Johnson (57) ABSTRACT

Computer-implemented methods and systems are provided for digitally signing predetermined arrays of digital data. Such a method may provide a secret neural network model trained to classify arrays of digital data in dependence on data content of the arrays. The array of the arrays may be signed by supplying the array to the secret neural network model to obtain an initial classification result; and effecting a modification of data in the array to change the initial classification result to a predetermined, secret classification result, the modification being effected via a backpropagation process in the secret neural network model to progressively modify the array in response to backpropagated errors dependent on a difference between a current classification result for the array and the secret classification result.

20 Claims, 9 Drawing Sheets

(51) Int. Cl.
   H04L 9/32      (2006.01)
   G06T 7/00      (2017.01)
   G06V 20/40     (2022.01)
   G06F 18/24     (2023.01)
   G06F 18/214    (2023.01)
(52) U.S. Cl.
   CPC ............ *G06T 7/0002* (2013.01); *G06V 20/40* (2022.01); *H04L 9/3247* (2013.01)

(56) References Cited

U.S. PATENT DOCUMENTS

| | | | |
|---|---|---|---|
| 10,630,483 | B2 | 4/2020 | Riley |
| 11,082,441 | B1 | 8/2021 | Bouguerra |
| 2019/0147582 | A1 | 5/2019 | Lee |
| 2019/0163889 | A1 | 5/2019 | Bouse |
| 2019/0171929 | A1 | 6/2019 | Abadi |
| 2019/0234799 | A1 | 8/2019 | Dorier |
| 2019/0236427 | A1 | 8/2019 | Micali |
| 2019/0236886 | A1 | 8/2019 | Dorier |
| 2019/0273618 | A1 | 9/2019 | Marshall |
| 2020/0064822 | A1 | 2/2020 | Song |
| 2020/0126209 | A1 | 4/2020 | Kim |
| 2020/0160502 | A1 | 5/2020 | Niessner |
| 2020/0210553 | A1 | 7/2020 | Lin |
| 2020/0293944 | A1 | 9/2020 | Furukawa |
| 2022/0237729 | A1* | 7/2022 | Wang ............... G06T 1/005 |

FOREIGN PATENT DOCUMENTS

| | | |
|---|---|---|
| CN | 110268410 A | 9/2019 |
| CN | 110490128 A | 11/2019 |
| CN | 110826380 A | 2/2020 |
| CN | 108920981 B | 6/2020 |
| CN | 112597519 A | 4/2021 |
| CN | 108053029 B | 8/2021 |
| CN | 108764270 B | 6/2022 |
| IL | 253685 A | 8/2017 |
| TW | 720932 B | 3/2021 |
| WO | 20180115361 W | 1/2018 |
| WO | 2019143936 A1 | 7/2019 |
| WO | 2019152983 A2 | 8/2019 |
| WO | 2019160960 A1 | 8/2019 |
| WO | 2019233341 A1 | 12/2019 |

OTHER PUBLICATIONS

Guohuan et al, "A Simple Digital Watermarking System Based on BP Neural Network" (published in 2008 International Conference on Computer Science and Software Engineering, vol. 04, pp. 863-866) (Year: 2008).*

"Deepfake Detection Challenge—Identify videos with facial or voice manipulations," Kaggle, https://www.kaggle.com/c/deepfake-detection-challenge.

"Wikipedia: No reliable sources, no verifiability, no article," printed Apr. 29, 2021, https://en.wikipedia.org/wiki/Wikipedia:No_reliable_sources,_no_verifiability,_no_article.

"You Won't Believe What Obama Says in This Video!," https://www.youtube.com/watch?v=cQ54GDm1eL0.

6.2 Adversarial Examples, printed Apr. 29, 2021, https://christophm.github.io/interpretable-ml-book/adversarial.html.

Anderson, Mark, "A Two-Track Algorithm to Detect Deepfake Images," Jul. 29, 2019, IEEE Journal Watch, https://spectrum.ieee.org/tech-talk/computing/software/a-twotrack-algorithm-to-detect-deepfake-images?referrer=%2F.

Blockchain, Wikipedia, printed Apr. 29, 2021, https://en.wikipedia.org/wiki/Blockchain.

Collins, Aengus. (2019). Forged Authenticity: Governing Deepfake Risks. Lausanne: EPFL International Risk Governance Center, https://infoscience.epfl.ch/record/273296/files/Forged%20Authenticity%20Governing%20Deepfake%20Risks.pdf.

Daniel Thomas, Deepfakes: A threat to democracy or just a bit of fun?, Jan. 23, 2020, BBC News, https://www.bbc.com/news/business-51204954.

Deepfake, Wikipedia, printed Apr. 29, 2021, https://en.wikipedia.org/wiki/Deepfake#Detection.

Ian Sherr, Microsoft can identify deepfakes now, just in time for the 2020 US election, Sep. 4, 2020, CNET, https://www-cnet-com.cdn.ampproject.org/c/s/www.cnet.com/google-amp/news/microsoft-is-fighting-deepfakes-ahead-of-the-2020-us-election/.

Image Detection, Recognition, and Classification With Machine Learning, Sep. 17, 2020, https://azati.ai/image-detection-recognition-and-classification-with-machine-learning/.

Is This Image Photoshopped?, printed Apr. 30, 2021, https://fixthephoto.com/image-photoshopped-or-not.html.

J. H. Bappy, C. Simons, L. Nataraj, B. S. Manjunath and A. K. Roy-Chowdhury, "Hybrid LSTM and Encoder-Decoder Architecture for Detection of Image Forgeries," in IEEE Transactions on Image Processing, vol. 28, No. 7, pp. 3286-3300, Jul. 2019, doi: 10.1109/TIP.2019.2895466.

Kiesha Frue, "What is Deepfake and Why Should you Care?" Sep. 12, 2019, https://towardsdatascience.com/what-is-a-deepfake-and-why-should-you-care-763f667321d0.

Liam Tung, "Forget email: Scammers use CEO voice 'deepfakes' to con workers into wiring cash," Sep. 4, 2019, https://www.zdnet.com/article/forget-email-scammers-use-ceo-voice-deepfakes-to-con-workers-into-wiring-cash/.

Mike Schroepfer, "Creating a dataset and a challenge for deepfakes," Published Sep. 5, 2019, Research—Computer Division, Facebook AI, https://ai.facebook.com/blog/deepfake-detection-challenge/.

Neil Dhillon and Tanmay Wadwha, "Verifying authenticity of digital images using digital signatures," Jan. 7, 2019, IP.com No. IPCOM000256882D, https://priorart.ip.com/IPCOM/000256882.

Pankaj Nain IPS, 'Tweet, #cybersecurity, printed Apr. 29, 2021, https://twitter.com/ipspankajnain/status/1247239544031686656?s=21.

Ranjay Krishna et al., "Visual Genome—Connecting Language and Vision Using Crowdsourced Dense Image Annotations," https://visualgenome.org, printed Apr. 9, 2021, 45 pages.

Rebecca Shepherd, "Fake Photo of Greta Thunberg Eating Lunch in Front of Poor Children Sparks Outrage," Published Sep. 27, 2019, https://www.ladbible.com/news/news-fake-photo-of-greta-thunberg-in-front-of-poor-children-sparks-outrage-20190927.

Residual neural network, printed Apr. 29, 2021, https://en.wikipedia.org/wiki/Residual_neural_network.

Terah Lyons, The Partnership on AI Steering Committee on AI and Media Integrity, Sep. 5, 2019, https://www.partnershiponai.org/the-partnership-on-ai-steering-committee-on-ai-and-media-integrity/.

Zao App, https://www.zaoapp.net/#!.

International Search Report and Written Opinion dated Aug. 4, 2022 from International Application No. PCT/IB2022/053812 filed Apr. 25, 2022.

* cited by examiner

SIGNING AND AUTHENTICATION OF DIGITAL IMAGES AND OTHER DATA ARRAYS

BACKGROUND

The present disclosure relates generally to signing and authentication of digital images and other arrays of digital data, and more particularly, to computer-implemented methods, systems, and computer program products for digitally signing data arrays, together with methods for authenticating signed arrays.

The trustfulness of information is becoming increasingly important in the modern world. With the rise of sophisticated techniques for manipulating data in ways that are difficult to detect, both people and machines can be fooled into wrongly interpreting information that appears to be authentic. A prominent example is the trend for manipulating digital images. Pictures and video can be altered using readily-available tools, and the resulting fakes can be difficult to identify as such while presenting very different information to the original, authentic versions.

People can be persuaded to trust what they see or hear simply because the fakes appear to be genuine. Machines such as AI (Artificial Intelligence) systems can also be duped by manipulated data. For example, so-called adversarial attacks on machine learning models introduce deliberate perturbations into data, such as digital image data, to cause a model to incorrectly interpret the data, e.g., to identify an image of a knife as an image of something else. Scams, and more sinister attacks, using such techniques can be extremely damaging to society.

Various techniques have been proposed for authenticating or analyzing data with a view to inhibiting or detecting unwanted manipulation. For example, algorithms have been designed to analyze videos for modifications or subtle inconsistencies, such as irregular lighting patterns, indicative of manipulation. Cryptographic signatures exploit a PKI (Public Key Infrastructure) for signing message data under a sender's private key, whereby a recipient can authenticate the message using a corresponding public key to verify the signature. Other techniques use blockchain to verify the source of data. Methods are also known for adding some type of watermark to data to indicate authenticity, though watermarks are generally easy to detect and so prone to counterfeit.

SUMMARY

One aspect of the present disclosure is a computer-implemented method for digitally signing arrays of digital data. The method may comprise providing a secret neural network model trained to classify arrays of digital data in dependence on data content of the arrays. The method may further comprise signing an array of the array by supplying the array to the secret neural network model to obtain an initial classification result; and effecting a modification of data in the array to change the initial classification result to a predetermined, secret classification result, the modification being effected via a backpropagation process in the secret neural network model to progressively modify the array in response to backpropagated errors dependent on a difference between a current classification result for the array and the secret classification result. The modification may comprise a minimal modification of data in the array and the secret neural network model may be trained to classify the arrays in dependence on image content thereof. The minimal modification may be effected via a backpropagation process in the neural network model. Methods may also determine whether signed arrays are authentic, or whether they have been modified. This may be achieved, in response to receipt of a previously-signed array to be authenticated, by supplying the array to the secret neural network model to obtain a further classification result, and comparing the further classification result to the secret classification result. If the results match then the array is authentic. If not, this proves that the array has been modified.

One aspect of the present disclosure is a computer-implemented method for digitally signing predetermined arrays of digital data. The method may provide a secret neural network model, which may be trained to classify such arrays in dependence on data content of the arrays. The method may further comprise, for an array to be signed, supplying the array to the neural network model to obtain an initial classification result, and effecting a minimal modification of data in the array to change the initial classification result to a predetermined, secret classification result. This minimal modification may be effected via a backpropagation process in the neural network model, whereby the array may be progressively modified in response to backpropagated errors dependent on a difference between a classification result for the array and the secret classification result.

Respective further aspects of the disclosure may provide a computing system for digitally signing data arrays via a method described above, and a computer program product comprising a computer readable storage medium embodying program instructions, executable by a computing system, to cause the computing system to implement such a method.

Embodiments of the disclosure will be described in more detail below, by way of illustrative and non-limiting example, with reference to the accompanying drawings.

DETAILED DESCRIPTION

The present disclosure relates generally to signing and authentication of digital images and other arrays of digital data, and more particularly, to computer-implemented methods, systems, and computer program products for digitally signing data arrays, together with methods for authenticating signed arrays. While the present disclosure is not necessarily limited to such applications, various aspects of the disclosure may be appreciated through a discussion of various examples using this context.

In operation, some embodiments of this disclosure may use a technique based on an adversarial attack, discussed above, for digitally signing data arrays. Unlike adversarial attack, these methods may use a secret neural network model, which may be pretrained for classifying the particular type of data arrays to be signed, and the signature may be applied by effecting only a small, or even minimal, modification of the array data to change the classification result from this model to a predetermined secret result. The resulting modification may constitute a digital signature which is both encoded in the array itself and specific to a particular array. Without access to the model (which is kept secret and hence known to authorized parties only), as well as the secret classification result for the signing process, signatures cannot feasibly be faked. Moreover, signed arrays may be authenticated by re-supplying the array to the secret model and confirming that the secret classification result is obtained. If not, then the array has been modified. This technique may thus offer both authentication of original data and proof that data has been modified when this is so.

The signature may be encoded as a minimal modification to data, effected via a backpropagation process, to obtain the secret classification result from the model. The backpropagation process, in turn, may involve an optimization process to modify parameters in an optimal manner to achieve a desired result from a neural network (NN) model. In applying this technique for modifying data in an input array, the extent of these modifications may be constrained such that the secret classification result may be obtained with only minimal modification of data in the array. Signatures may therefore be applied without significant change in the data array as a whole with regard to purpose or function of the array. In the case of image data, for example, the signature may be encoded in an array of image data without changing how the image will be perceived by a human observer, or even by an AI process, such as another image classification model.

The NN model may be constructed and trained for classifying a particular type of data array, predetermined for the signature process. Some embodiments may be adapted for signing arrays of digital image data. The NN model may then be trained to classify such arrays in dependence on image content thereof. The image data arrays may encode independent, static images or individual frames of video. In particular, embodiments may be applied to sign digital video sequences. Here, the data arrays correspond to frames of digital video, and the above method is performed for each frame of a video sequence. Other embodiments may be adapted for signing arrays of digital audio data. The NN model may then be trained to classify such arrays in dependence on audio content thereof.

The secret NN model may be trained as a preliminary, setup phase of the signing method, consistent with some embodiments. Some embodiments may train the NN model using a secret training dataset of the data arrays in question. A secret training dataset may be constructed from a public dataset by selection and/or modification of training samples to produce a dataset which is unique. This dataset may then be kept secret to enhance security of the signature process.

The secret classification result may be advantageously defined in terms of more than one of the possible classes in which arrays can be classified by the model. In some embodiments, the neural network model may be adapted to output a confidence value for classification of an array in each of a plurality of classes, and the secret classification result may be dependent on the confidence values for at least two of these classes. By appropriately selecting this class combination, the secret classification result may be differentiated from any likely initial classification result for an unsigned array. Using a combination of confidence values may also enhance security of the secret result, and hence, the signature process as a whole.

To constrain overall change to a data array due to the signing process, the array may be modified, in each of a plurality of iterations of the backpropagation process, by modifying data for which the backpropagated errors satisfy a predetermined condition for identifying the largest backpropagated errors in that iteration. This may both simplify processing and may restrict modifications in each iteration to the most significant data for achieving the desired result, e.g., data associated with the largest backpropagated errors as defined by the aforementioned condition. This condition may identify backpropagated errors with absolute values greater than a threshold dependent on the largest absolute error value in the iteration. This may provide an adaptive process that scales to diminish errors as backpropagation iterates. Further techniques for constraining overall modification of the array are explained in detail below.

Methods consistent with the disclosure may also determine whether signed arrays are authentic or whether they have been modified. This may be achieved, in response to receipt of a previously-signed array to be authenticated, by supplying the array to the secret neural network model to obtain a further classification result, and comparing the further classification result to the secret classification result. If the results match then the array is authentic. If not, this suggests that the array has been modified. Some embodiments may also employ mechanisms, detailed below, for distinguishing previously-signed arrays from arrays that have never been signed. Embodiments of the present disclosure may be implemented as a system, a method, and/or a computer program product. The computer program product may include a computer readable storage medium (or media) having computer readable program instructions thereon for causing a processor to carry out aspects of the present disclosure.

The computer readable storage medium may be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as including transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, may implement the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein may comprise an article of manufacture including instructions that implement aspects of the function/act specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts/operations specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which may comprise one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

Some embodiments may be performed as computer-implemented methods for digitally signing data arrays. Such methods may be implemented by a computing system comprising one or more general- or special-purpose computers, each of which may comprise one or more (real or virtual) machines, providing functionality for implementing operations described herein. Operations of methods embodying the disclosure may be implemented by program instructions, e.g. program modules, implemented by a processing apparatus of the system. Generally, program modules may include routines, programs, objects, components, logic, data structures, and so on that perform particular tasks or implement particular abstract data types. The computing system may be implemented in a distributed computing environment, such as a cloud computing environment, where tasks may be performed by remote processing devices that are linked through a communications network. In a distributed computing environment, program modules may be located in both local and remote computer system storage media including memory storage devices.

Figure 1:
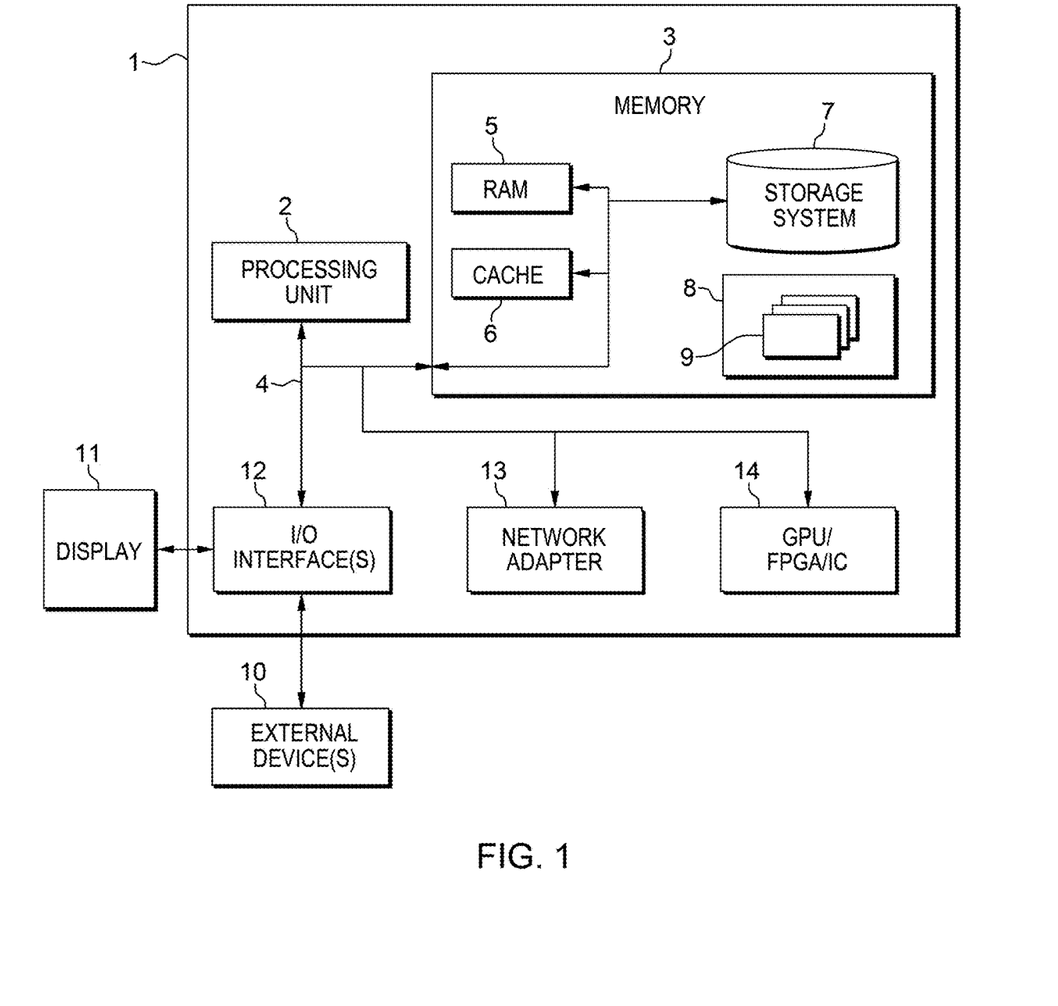
FIG. 1 is a schematic representation of a computing system for implementing methods, consistent with some embodiments of the disclosure.

FIG. 1 is a block diagram of an example computing apparatus for implementing methods consistent with some embodiments of the disclosure. The computing apparatus in FIG. 1 is shown in the form of a general-purpose computer 1. The components of computer 1 may include processing apparatus (e.g., one or more processors represented by processing unit 2), a system memory 3, and a bus 4 that couples various system components including system memory 3 to processing unit 2.

Bus 4 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer 1 may include a variety of computer readable media. Such media may be any available media that is accessible by computer 1 including volatile and non-volatile media, and removable and non-removable media. For example, system memory 3 may include computer readable media in the form of volatile memory, such as random access memory (RAM) 5 and/or cache memory 6. Computer 1 may further include other removable/non-removable, volatile/non-volatile computer system storage media. By way of example only, storage system 7 may be provided for reading from and writing to a non-removable, non-volatile magnetic medium (commonly called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can also be provided. In such instances, each may be connected to bus 4 by one or more data media interfaces.

Memory 3 may include at least one program product having one or more program modules that may be configured to carry out some functions of embodiments of the disclosure. By way of example, program/utility 8, having a set (at least one) of program modules 9, may be stored in memory 3, as well as an operating system, one or more application programs, other program modules, and program data. One or more of the operating system, one or more application programs, other program modules, and program data, or some combination thereof, may include an implementation of a networking environment. Program modules 9 generally carry out the functions and/or methodologies of embodiments of the disclosure as described herein.

Computer 1 may also communicate with: one or more external devices 10 such as a keyboard, a pointing device, a display 11, etc.; one or more devices that enable a user to interact with computer 1; and/or any devices (e.g., network card, modem, etc.) that enable computer 1 to communicate with one or more other computing devices. Such communication may occur via Input/Output (I/O) interfaces 12. Also, computer 1 can communicate with one or more networks such as a local area network (LAN), a general wide area network (WAN), and/or a public network (e.g., the Internet) via network adapter 13. As depicted, network adapter 13 communicates with the other components of computer 1 via bus 4. Computer 1 may also communicate with additional processing apparatus 14, such as one or more GPUs (graphics processing units), FPGAs, or integrated circuits (ICs), for implementing embodiments of the disclosure. It should be understood that other hardware and/or software components may be used in conjunction with computer 1. Examples include, but are not limited to: microcode, device drivers, redundant processing units, external disk drive arrays, RAID systems, tape drives, and data archival storage systems, etc.

Figure 2:
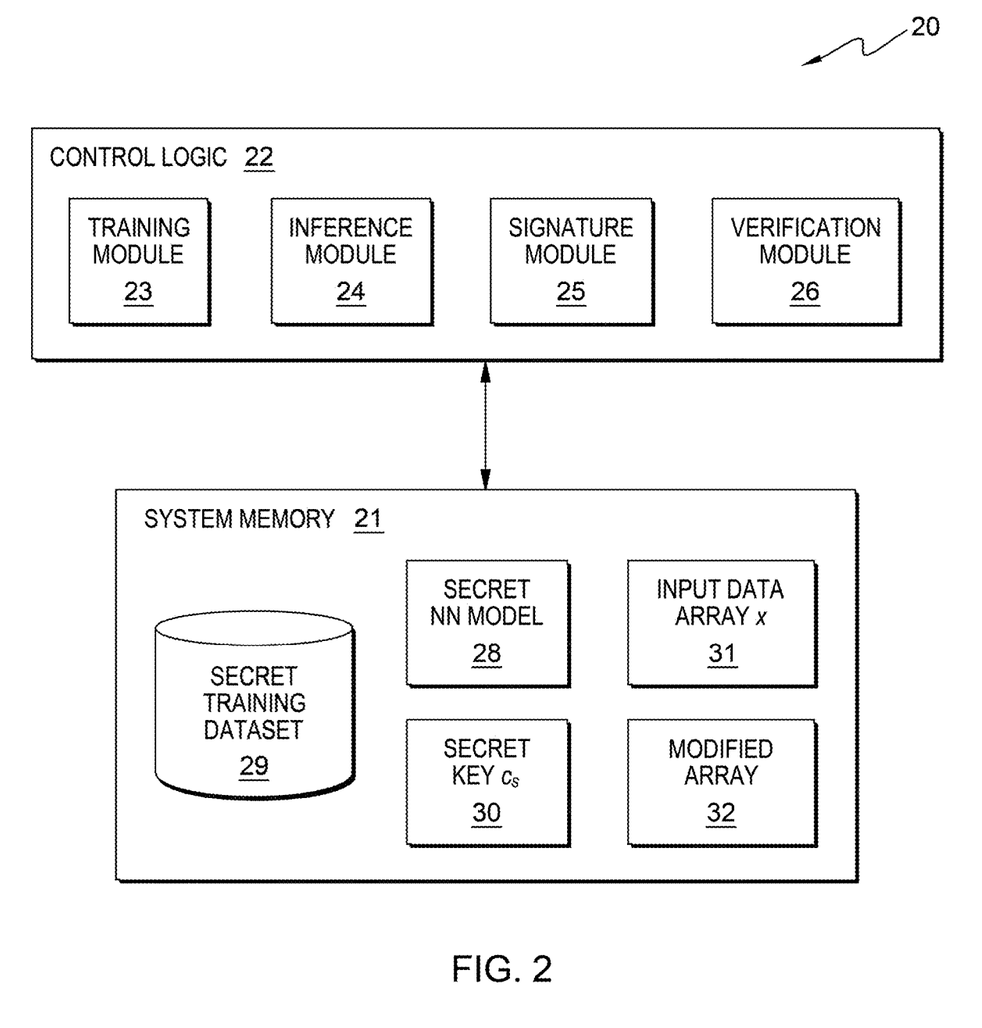
FIG. 2 illustrates component modules of one embodiment of a computing system for signing data arrays, consistent with some embodiments of the disclosure.

The FIG. 2 schematic illustrates component modules of an example computing system for signing/authentication of arrays of digital data, consistent with some embodiments of the disclosure. The computing system 20 may comprise memory 21 and control logic, indicated generally at 22, which may comprise functionality for authenticating data arrays by digitally signing the arrays and also checking the authenticity of signed arrays. Control logic 22 may comprise a training module 23, an inference module 24, a signature module 25, and a verification module 26. Training module 23 may comprise functionality for training an NN model to classify digital data arrays. Inference module 24 may provide functionality for performing inference (classification) operations with the model. Signature module 25 may implement the signing process for inserting a digital signature in a data array, and verification module 26 may provide functionality for testing authenticity of signed arrays. The logic modules 23 through 26 may interface with memory 21, which may store various data structures used in operation of system 20. These data structures may include the parameters of a secret NN model 28, which may be trained by training module 23 using a secret training dataset 29, and a secret "key" 30 for the signature process. This key may define a secret classification result, denoted by $c_s$, to be obtained from inference operations of model 28 on signed data arrays. Memory 21 may also store a data array (denoted by x) 31, which may be input for the signature process, as well as a modified array 32 that may be produced from the input array x at successive stages of the signature process.

In general, logic modules 23 through 26 and functionality of NN model 28 may be implemented by software (e.g., program modules) or hardware or a combination thereof. Functionality described may be allocated differently between system modules in other embodiments, and functionality of one or more modules may be combined. While NN model embodiments may be implemented entirely in software, other neural network embodiments may be implemented (wholly or partially) in hardware. Some NN models may exploit a logical construction in which a series of layers of neurons are interconnected so that output signals of neurons in one layer are weighted and transmitted to neurons in the next layer. Some implementations for neurons and synapses (which may store the network weights) may include circuits that exploit memristive properties of nanodevices, e.g., resistive memory cells such as phase-change memory (PCM) cells and resistive RAM (RRAM, or ReRAM) cells. Dense crossbar arrays of such memristive devices may offer massively parallel and highly area- and energy-efficient neural networks in some embodiments. Neural network architectures may employ dedicated integrated circuits, e.g., providing resistive memory arrays for storing the network weights, and/or FPGAs for configuring functional components of a network.

The component modules of computing system 20 may be provided in one or more computers of a computing system. For example, all modules may be provided in a computer 1, or modules may be provided in one or more computers/servers of a computing system to which users can connect via a network for input of data arrays to be processed. Such a network may in general comprise one or more component networks and/or internetworks, including the Internet. System memory 21 may be implemented by one or more memory/storage components associated with one or more computers of system 20.

Figure 3:
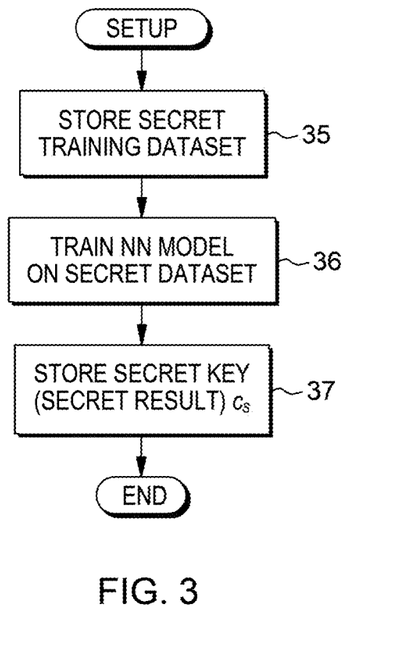
FIG. 3 illustrates setup operations for a signing process in the FIG. 2 system, consistent with some embodiments of the disclosure.

FIG. 3 illustrates a preliminary setup operation, consistent with some embodiments. Operation 35 represents provision in system memory 21 of the secret training dataset 29. This dataset contains a set of labeled training samples. Each sample may comprise an example of the particular type of data array to be signed by system 20, plus the corresponding classification result (label) to be obtained for that example. This dataset may be constructed from scratch by collating and labeling a set of training samples. However, dataset 29 may also be conveniently constructed from any publicly-available dataset of the data arrays (e.g., digital images) in question. The training dataset may be made unique by selecting a subset of samples from a public dataset, e.g., by removing some samples and/or classes. Training samples may also be modified, e.g., to include some errors, such as incorrect labels, and/or supplemented with additional samples. One feature and advantage of these operations is the construction of a unique dataset and/or a dataset that is not representative of the class distribution of the public dataset, so as to enhance security of the signature system. The resulting training dataset 29 may then be stored in system memory 21.

In operation 36, the NN model 28 may be trained by training module 23 using training dataset 29. In general, any NN classification model may be employed as model 28, with the model architecture being constructed appropriately to accommodate the training samples in question. In some embodiments, the model may be constructed with the appropriate number of inputs to receive the data values (denoted by $x_i$, i=1 to L, herein) in an array x of L such values, and the model output may be adapted to provide classification results for the classes represented in the training set. For example, a classification network for digital images may be provided with an input layer for receiving the pixels $x_i$ of a digital image in a given image format. The NN model may comprise a simple feedforward network structure with two or more layers, or may comprise more complex structures, such as convolutional layers. Other model architectures for a given application, however, are also within the scope of this disclosure. As illustrative examples only, NN model 28 may be based on a feedforward architecture, or a ResNet-50, VGG16, or InceptionV3 network architecture. For training complex models, such as a ResNet-50 model, the training module 23 may exploit cloud-based supercomputers (with appropriate security measures, e.g., via a private cloud) that allow such models to be trained within minutes at minimal cost.

Training module 23 may train NN model 28 in operation 36. The network weights may be trained via an iterative process in some embodiments, in which the network may be supplied with successive training samples and the weights may be repeatedly updated based on difference between the network output and the target output (label) for a training sample. In this process, errors may be backpropagated through the network and the weights may be incrementally updated, based on the backpropagated errors, so as to optimize the network operation. The weights may thus be progressively updated until a convergence condition, e.g., a desired accuracy, is achieved. One or more subsets of the training dataset 29 may be reserved as validation/test sets, which may be used by inference module 24 to quantify model performance at various stages of the training operation, and model parameters may be adjusted as necessary to achieve a desired accuracy. The resulting trained model, with the optimized weights, may then be applied for inference to classify new (previously unseen) input data.

In operation 37 of the setup procedure, the secret key (secret classification result) $c_s$ may be selected and stored for the signature system. This key $c_s$ may define the required output of model 28 after the signing process for a data array, e.g., when the model is applied for inference on a signed array. To effect that this result is different from any likely, initial result for an unsigned array, $c_s$ may be conveniently defined in terms of a combination of the possible classes in which arrays can be classified by the model. The NN classification models in some embodiments may also provide some form of confidence value, e.g., as a probability or percentage, for classification of the input in each of the possible classes. By defining the secret classification result in dependence on confidence values for at least two classes, the secret result may be based on an unlikely class combination. As a simple example, $c_s$ may require that two very different classes are the majority classes and/or that the confidence values for these classes exceed certain threshold values. Another example of $c_s$ may require that confidence values $c_1$ and $c_2$ for the two (predetermined) majority classes are such that $(c_1+c_2)$ exceeds a first threshold, e.g., 0.7, and $|c_1-c_2|$ is less than a second threshold, e.g., 0.1. Additionally, the secret result $c_s$ may be defined in terms of any desired function of one or more confidence values selected to differentiate the classification results for signed and unsigned arrays. The key $c_s$ for a given application may be selected by an operator, or may be selected automatically as an unlikely result based on processing of training samples. The selected key may be stored at 30 in system memory 21, and system 20 is then ready for signing data arrays.

Figure 4:
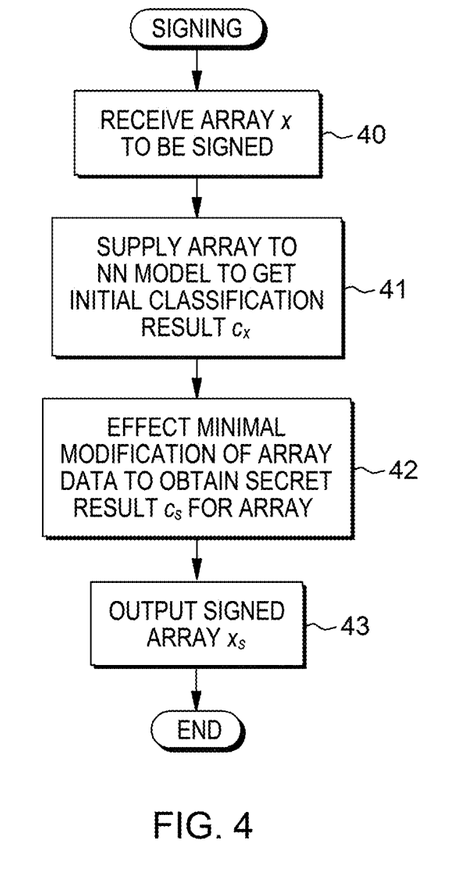
FIG. 4 illustrates operations of a signing process for a data array, consistent with some embodiments of the disclosure.

FIG. 4 illustrates the basic operations of a signature process, consistent with some embodiments. Operation 40 represents receipt by control logic 22 of a data array x to be signed. In operation 41, the signature module 25 may supply the array x to model 28 to obtain an initial classification result, denoted by $c_x$, for the array. In operation 42, the signature module may effect only a small, or even minimal, modification of the data in array x to change the initial classification result $c_x$ to the secret classification result $c_s$. This at least a minimal modification may be effected via a backpropagation process in the NN model, in which the array may be progressively modified in response to back-propagated errors dependent on difference between a classification result for the array and the secret classification result $c_s$. The resulting signed array, denoted by $x_s$, may be output by system 20 in operation 43.

The backpropagation process in operation 42 is explained in more detail in the following. Backpropagation may be used to optimize the network weights during training. Briefly, backpropagation is an iterative process in which errors may be calculated based on difference between the actual and target network outputs. These errors may be backpropagated through the network, layer by layer from the output to the input layer, to determine the errors at the input to each layer. The backpropagated errors may then be used to calculate updates to parameters (usually the network weights) via an optimization algorithm, e.g., a gradient descent method such as stochastic gradient descent.

Figure 5:
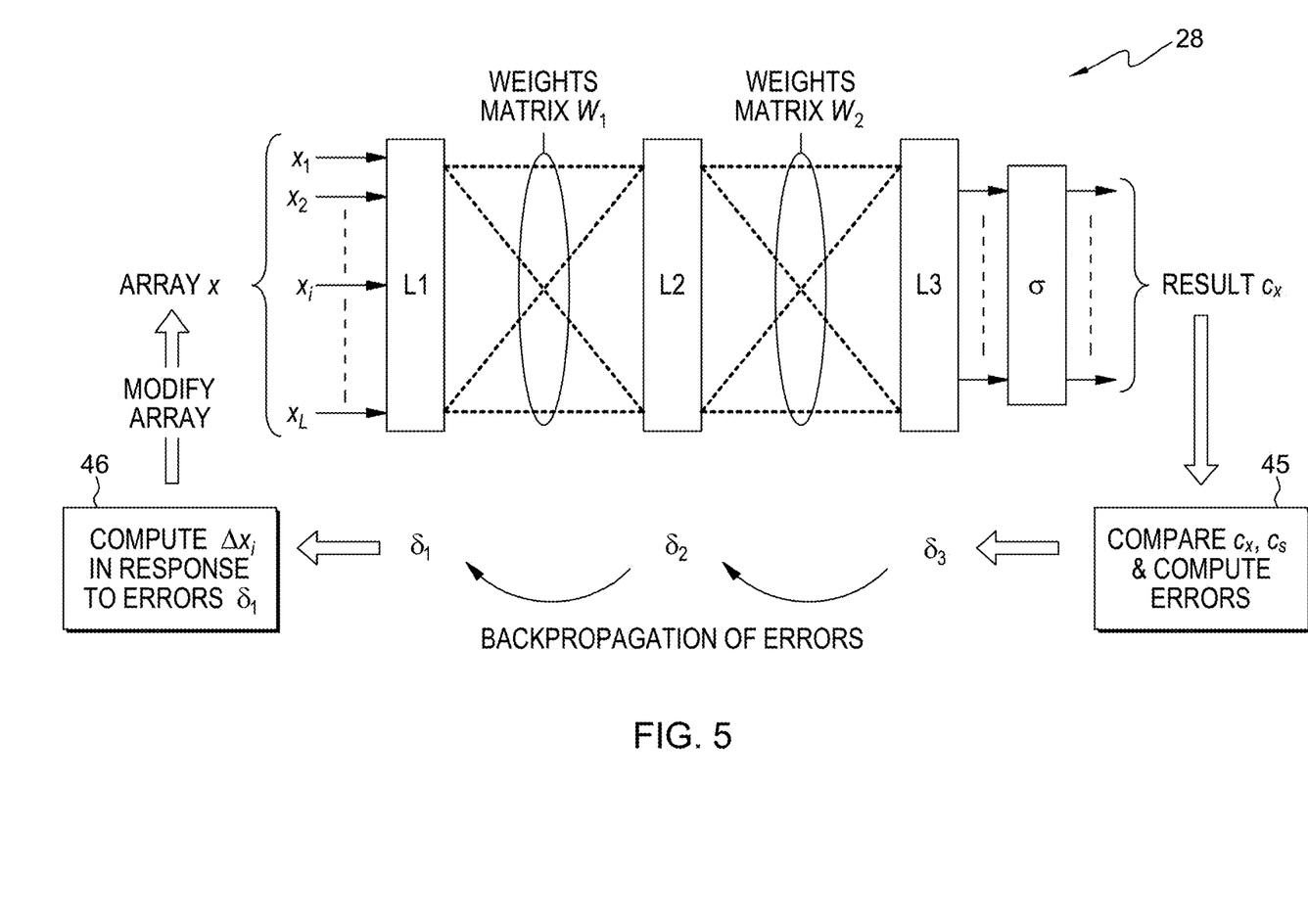
FIG. 5 illustrates a backpropagation process performed in the signing operation, consistent with some embodiments of the disclosure.

One embodiment of a backpropagation process for the signing operation is illustrated schematically in FIG. 5. Here, NN model 28 is illustrated as a simple feedforward network with three layers, L1 to L3. Connections between the network layers are indicated schematically by dotted lines in the figure. These connections may relay signals between neurons of successive layers, and these signals may be weighted by respective weights w of the network. The weights between successive network layers are defined by a weights matrix, and these matrices are denoted by $W_1$ and $W_2$ for the three-layer network shown. An input array x, comprising an array of data values $x_1$ to $x_L$, may be supplied to input layer L1, whereby weighted signals may be propagated through the network to the output layer L3. In this example, the output signals of layer L3 are converted into a set confidence values, one for each possible class, by a SoftMax layer σ. This set of confidence values may provide the initial classification result $c_x$ for the input array x.

As indicated by block 45, signature module 25 may compare the result $c_x$ with the secret result $c_s$ and may compute a matrix of errors, denoted by 63, associated with respective input signals to layer L3. These errors may then be backpropagated to calculate the corresponding errors, denoted by $\delta_2$ and $\delta_1$, at the inputs to layers L2 and L1 respectively. When backpropagation is applied to optimize the network weights of a classification model during training, backpropagated errors $\delta$ may be calculated as the gradient of a loss function (which depends on difference between the actual and target classification results) with respect to the weights associated with each layer, and the errors $\delta$ may then be used to calculate updates $\Delta w$ to respective weights w. In some embodiments, however, the network weights may remain fixed for the signature process, and the gradients may be calculated with respect to the input signals at each network layer. The backpropagated errors $\delta_3$ to $\delta_1$ in FIG. 5 may be computed as the gradient of a loss function, dependent on difference between $c_x$ and $c_s$, with respect to the input signals, whereby $\delta_1$ defines the errors associated with respective data values $x_i$ of the input array x. As indicated by block 46, the signature module may then compute modifications $\Delta x_i$ to corresponding data values $x_i$ in dependence on the associated errors $\delta_i$ in matrix $\delta_1$. The array may then be modified by updating data values $x_i$ to $(x_i+\Delta x_i)$, and the process may then be repeated for the modified array.

The backpropagation process of FIG. 5 may iterate until the classification result $c_x$ for the modified array equals $c_s$. The extent to which the array is modified during this process can be constrained in various ways, with the overall objective in some embodiments being to change the classification result to $c_s$ with only a small, or even minimal, overall change to data in the array. For example, the loss function may be used to calculate the gradients (errors $\delta$), and hence, modifications $\Delta x_i$, may depend on both difference between the actual and target classification results $c_x$, $c_s$ and also an overall change in the array resulting from the modifications. As illustration, the loss E may be defined as a function F of the difference $(c_x-c_s)$ and the sum of the absolute differences between the modified and original data values $x_i$:

$$E=F((c_x-c_s),\Sigma_{i=1}L|x_i^{input}-x_i|),$$

where $x_i^{input}$ are the data values in the original input array. Because the modifications $\Delta x_i$ in each iteration of the backpropagation process may be calculated to mitigate the loss function though the optimization process in some embodiments, the overall change in the array may be constrained via such a loss function. While a particular example is given above, the overall change in the array may be expressed using various metrics in the loss function, e.g., in terms of the L-infinity bound, MSR (Mean Square Error) or PSNR (Peak Signal-to-Noise Ratio) of the modifications.

Figure 6:
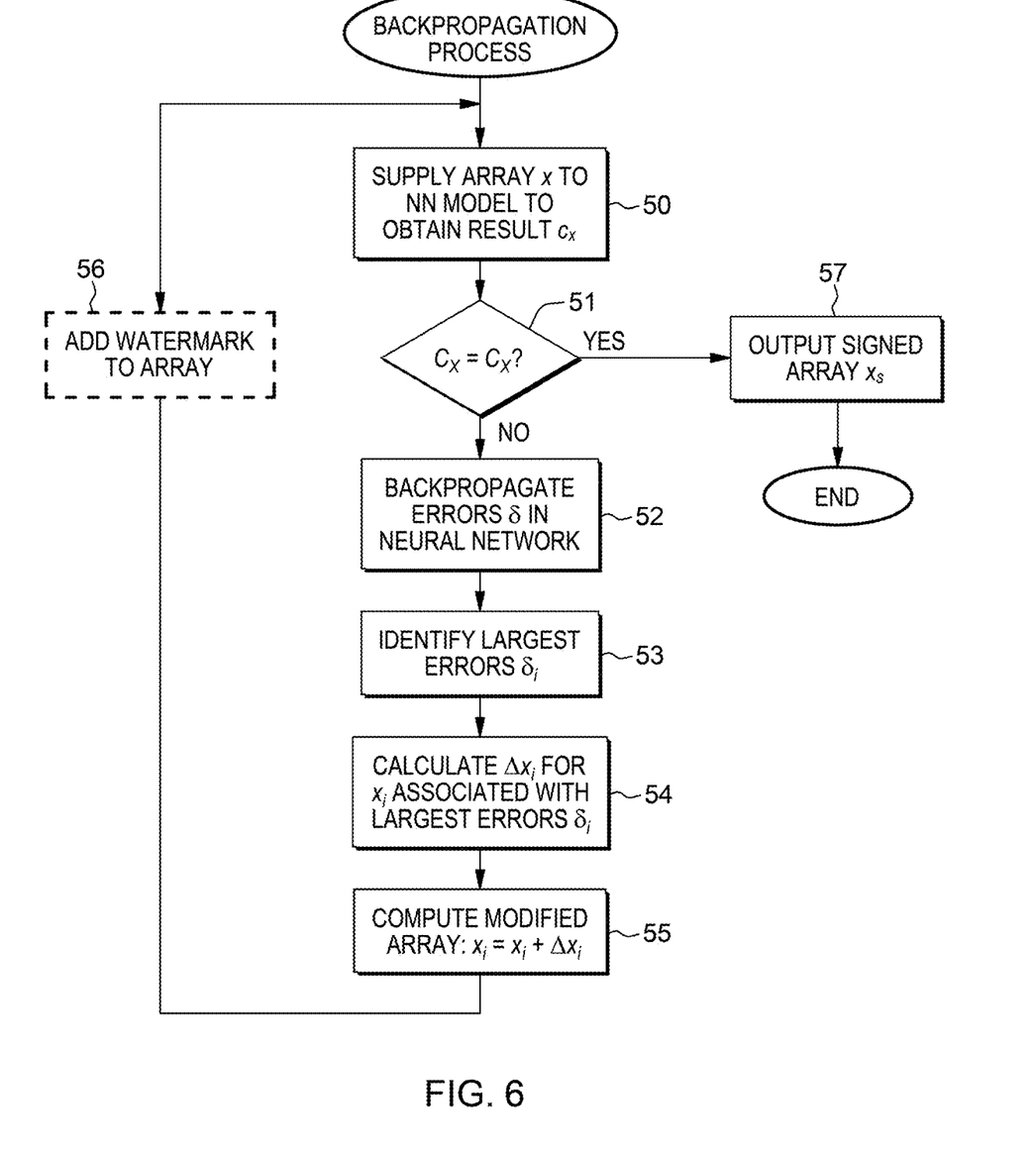
FIG. 6 illustrates operations of a backpropagation process, consistent with some embodiments of the disclosure.

FIG. 6 illustrates operations of a backpropagation process employing another technique to constrain modifications, consistent with some embodiments. The array x may be supplied to the model in operation 50 and the classification result $c_x$ may be compared to $c_s$ in operation 51. If $c_x$ does not match $c_s$, errors may be backpropagated in operation 52 as described above. In operation 53, the signature module may identify the largest backpropagated errors $\delta_i$ in $\delta_1$ for the current iteration. In this embodiment, the signature module may identify errors $\delta_i$ with absolute values greater than a threshold dependent on the largest absolute error value $|\delta_{max}|$ in the iteration. By way of example, errors $\delta_i$ for which $|\delta_i|>80\%$ of $|\delta_{max}|$ may be selected here. In operation 54, the signature module then calculates modifications $\Delta x_i$ for the data values $x_i$ associated with the selected, largest errors $\delta_i$. The array may then be modified in operation 55 by updating these data values $x_i$ to $(x_i+\Delta x_i)$. For example, modifications may be calculated here as $\Delta x_i=-\eta\delta_i x_i$ where $\eta$ is a predetermined learning parameter for the network, e.g., $\eta=0.01$. Following operation 55, operation 56 is an optional additional operation performed in embodiments detailed below, and operation may revert to operation 50 for the modified array. The process may thus iterate until $c_x=c_s$ in operation 51, whereupon the signed array $x_s$ may be output in operation 57.

As well as simplifying processing, operations 53 and 54 of FIG. 6 may constrain changes to the array by restricting modifications to the most significant data, associated with the largest backpropagated errors, in each iteration, thereby limiting the overall change to the original input array x. This process may also be adaptive to changing scale of the errors over successive iterations. However, various other conditions can be envisaged for identifying the largest errors. For instance, the n largest errors could be selected in each iteration for some predefined value of n.

In operation 54 of FIG. 6, modifications to data in the array may be subject to a further constraint on the change in the array resulting from the modifications. Such a constraint may limit the maximum change to individual data values $x_i$, in each iteration and/or over all iterations. For example, the L-infinity bound of the modifications may be restricted to a very small value, e.g. 0.05 (or even smaller values) in each iteration. Constraints here may of course be based on other metrics, such as the mean squared error (MSE) or peak signal-to-noise ratio (PSNR) of modifications. Additionally, one or a combination of the various techniques described above may be used to ensure a small or minimal overall change in an array due to the signing process.

Figure 7:
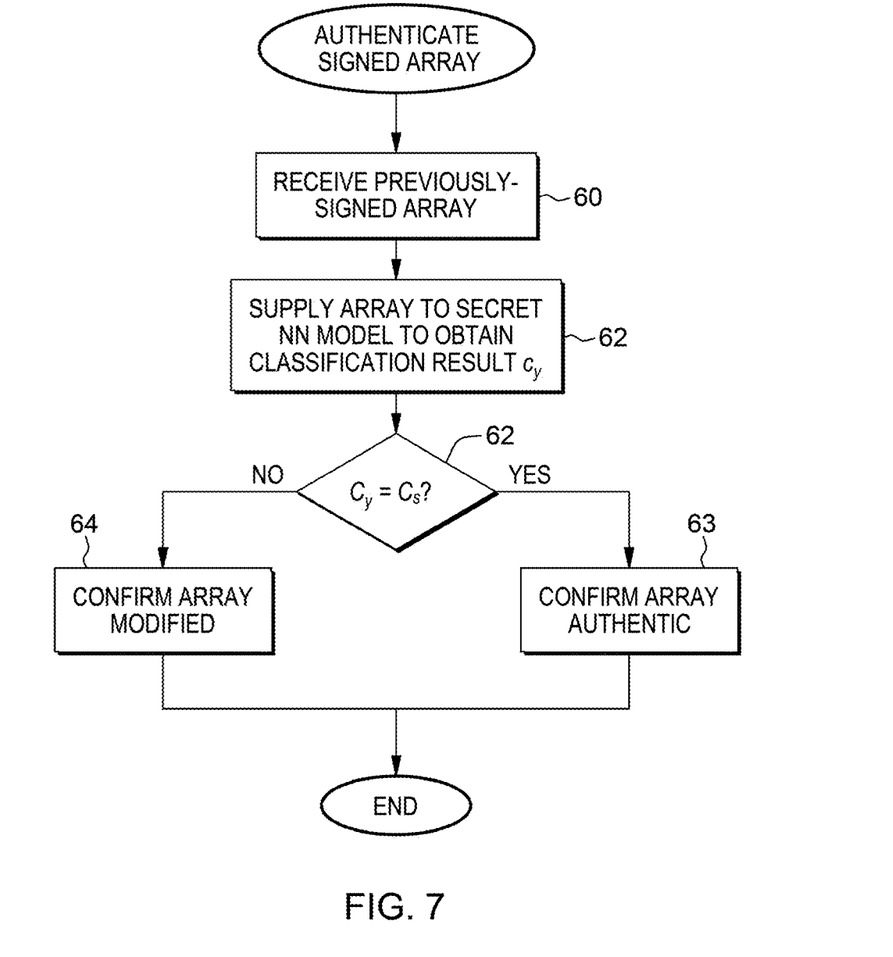
FIG. 7 illustrates operations for authenticating an array previously-signed by the FIG. 2 system, consistent with some embodiments of the disclosure.

The system 20 may also determine whether data arrays previously-signed by the system are authentic or have been modified post-signing. The operations of one embodiment of this authentication method performed by verification module 26, are indicated in FIG. 7. Operation 60 represents receipt of a previously-signed array to be authenticated by the system. In operation 61, the verification module 26 may supply the array to model 28 to obtain a further classification result, denoted here by $c_y$, for the array. In operation 62, the verification module may compare this result $c_y$ to the secret classification result $c_s$ to determine whether the array is authentic. If $c_y=c_s$, the array has not been modified and, in response in operation 63, the system may provide an output confirming that the array is authentic. If $c_y \neq c_s$ in decision operation 62, this proves that the array has been modified since signature. In operation 64, the system then may then provide an output warning that the array has been modified.

An example implementation of one embodiment of the signature system is described in detail in the following. This embodiment was applied to signing digital images, in particular pictures of every-day life. A secret training dataset for this embodiment was generated from the Visual Genome dataset, which is a public dataset of over 100,000 images with over 80,000 labels and is available for download as of the filing date of this disclosure under the CC BY 4.0 license at https://visualgenome.org. The training dataset was made unique by removing 60% of the images (where images were deliberately removed to ensure a unique class distribution in the training dataset). More than half of the original images were removed with a view to achieving a trained model in which the adversarial signing process can be performed without excessive processing of images, i.e., to reduce the backpropagation processing necessary to change the inference result to the target, secret result. The training dataset was further divided into training, validation, and test sets.

A ResNet-50 network was trained with the data prepared above, and hyperparameters/architecture were varied until performance of the model, measured here by F1 score, achieved F1>0.7. In particular, the validation set was used for inference to quantify performance after training the network weights on successive batches of training samples, until an F1 score of F1>0.7 was achieved with the validation set. Hyperparameters (e.g., neuron activation functions, etc.) and architecture (e.g., neuron numbers and interconnections) were adjusted as required during this process. Performance on the test set was then assessed, with further hyperparameters/architecture adjustments being made as necessary, to obtain F1>0.7 on the test set.

For the class combination to be used in the secret key $c_s$, the labels "carpet oriental" and "information sticker" were chosen from labels in the training dataset. In particular, the secret classification result $c_s$ was defined to require "carpet oriental" and "information sticker" as the two majority classes (highest confidence values) in the inference result for a signed image. The model was then applied to sign images, as exemplified in the following.

A new image to be signed was passed through the network and output the two majority classes "opened bag" and "carpet oriental" with confidence values of 0.05 and 0.02 respectively. The backpropagation process described above was applied first to modify the image to obtain "carpet oriental" as the majority class. In each iteration of the backpropagation operation, only pixels corresponding to the largest backpropagated errors were modified, here pixels $x_i$ for which $|\delta_i|>80\%$ of $|\delta_{max}|$, to ensure that the majority of pixels were unmodified. The backpropagation process was then repeated for the class "information sticker" until the result $c_s$ was achieved, i.e., the two majority classes were as required. This gave the signed image.

While an F1 score of F1>0.7 was used in the training example above, this threshold may be selected as desired, depending, for example, on choice of network architecture and complexity of the training dataset. Lower thresholds may be appropriate for simpler architectures and more complex datasets. Other performance measures than F1 score, e.g., Accuracy, or some other function of Precision and Recall, may also be employed. Additionally, while a weak (poor performance) model may be advantageous for ease of adversarial signing, a stronger (even overfitted) model increases complexity of the digital signature, and so, may enhance security of the signature system. The trade-off between these issues may be balanced as desired for a given application.

Figure 8A:
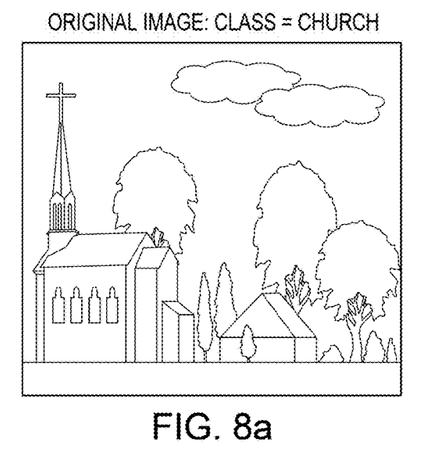
FIGS. 8a through 8d are images that illustrate the operation of the system for a digital image, consistent with some embodiments of the disclosure.
Figure 8B:
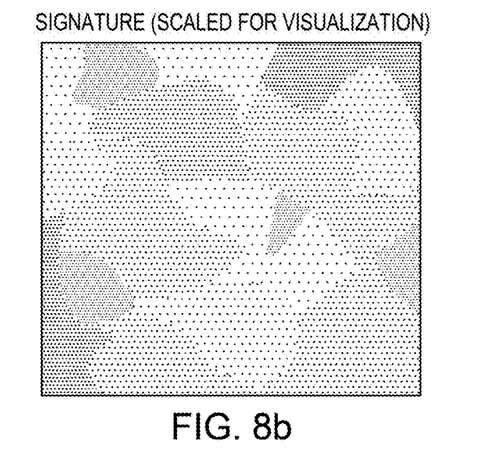
Figure 8C:
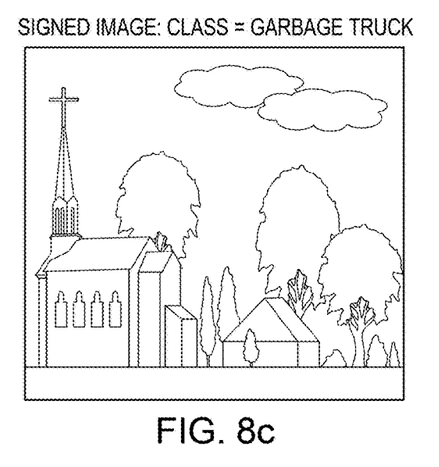
Figure 8D:
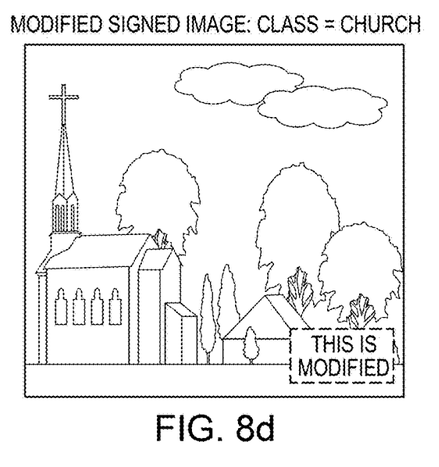

To illustrate the effect of signature on a signed image, FIGS. 8a through 8d show an illustrative example. This figure demonstrates operation of a simple embodiment in which the secret classification result required a single class "garbage truck" to be the majority class for signed images. FIG. 8a shows an input image for which the initial, correct classification result of "church" was obtained from the model. FIG. 8b shows a (scaled and normalized) representation of the signature applied to this image. Black pixels in this representation signify no modification to the corresponding image pixels. Modified pixels are shown here on a grey scale (reflecting a color pattern in the real example), and have been significantly enhanced for visualization. (The true signature would appear as all-black in this image, corresponding to imperceptible (to a human) undesirable noise). FIG. 8c shows the signed image, which appears unchanged but provided the required inference result "garbage truck" from the model. When this signed image was modified by the small text addition highlighted by the dashed box in FIG. 8d, the model again output the correct inference result "church" for the image. By applying a visually imperceptible noise pattern as a distinct signature in an input image, the signature can thus be used to differentiate modified and unmodified images. The original image in FIGS. 8a-8d was a color image, shown herein as a black and white line drawing.

Figure 9:
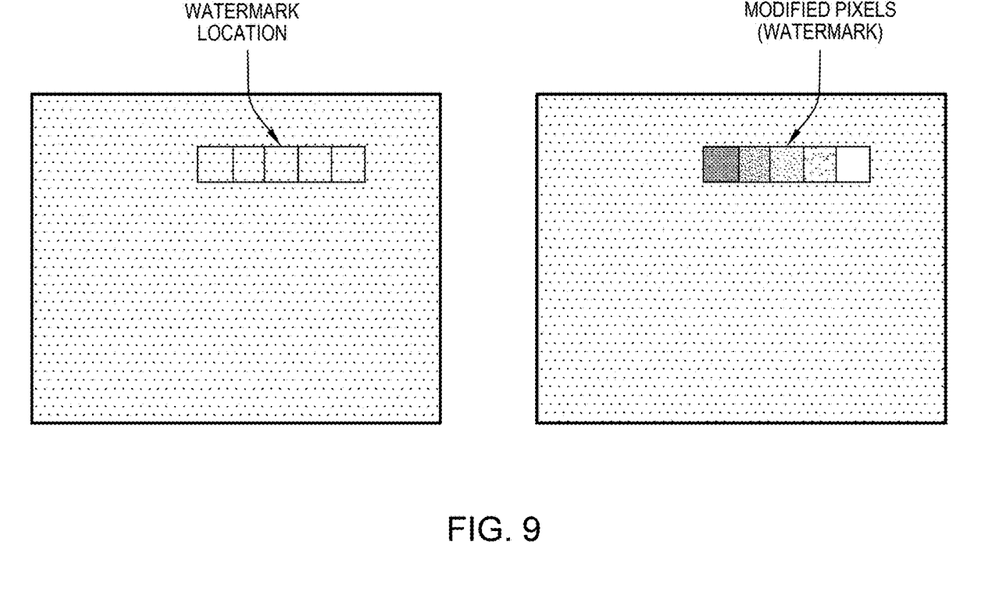
FIG. 9 illustrates one embodiment of a watermarking technique.

Some embodiments may also include a method and/or mechanism for determining whether or not an image, presented to verification module 26 for authentication, has been previously signed by the system. An image that has never been signed cannot otherwise be distinguished from a previously-signed, but modified, image. In some embodiments, the signature module may maintain a register of signed arrays in system memory 21. The signature module may store an array identifier, associated with each array signed by the system, in this register to allow subsequent identification of arrays that have been signed. For instance, identifiers supplied with images to be signed may be stored along with a supplier identifier, e.g., an upload location. Other systems may use a watermarking technique to identify signed arrays. Here, as part of the signing process, the signature module may modify a subset of data in the array in a predetermined manner to apply a watermark to the array. FIG. 9 illustrates a watermarking process for an image (here a plain grey image for simplicity), consistent with some embodiments. This process may add a localized pattern at a predetermined location in the image, e.g. over a 10×10 pixel region at this location. The pixel values in this region may then be modified, based on some defined formula, relative to original pixel values in this region. In the simple example shown in FIG. 9, the value of a central pixel in a 5×1 region may be determined, and the neighboring pixels may then be modified as a function of this pixel value. Such a watermark may be provided at multiple image locations if desired. The verification module may then be analyzed a received image for presence of the watermark to distinguish signed from unsigned images. The original image in FIG. 9 was a color image, shown herein as a black and white line drawing.

Watermarking may be performed as a final stage, after signing an image. In some embodiments, the watermark may be removed, by reversing the original watermarking process, before authenticating the signed image. Some embodiments may therefore incorporate the watermarking process in the backpropagation process. Advantageously, as indicated by operation 56 in FIG. 6, the watermark may be applied after each update to the array x in an iteration of the backpropagation process. This may allow the watermark to be imposed as part of the signing process itself, whereby the signed array will contain a detectable watermark that need not be removed before authentication of the array.

Figure 10:
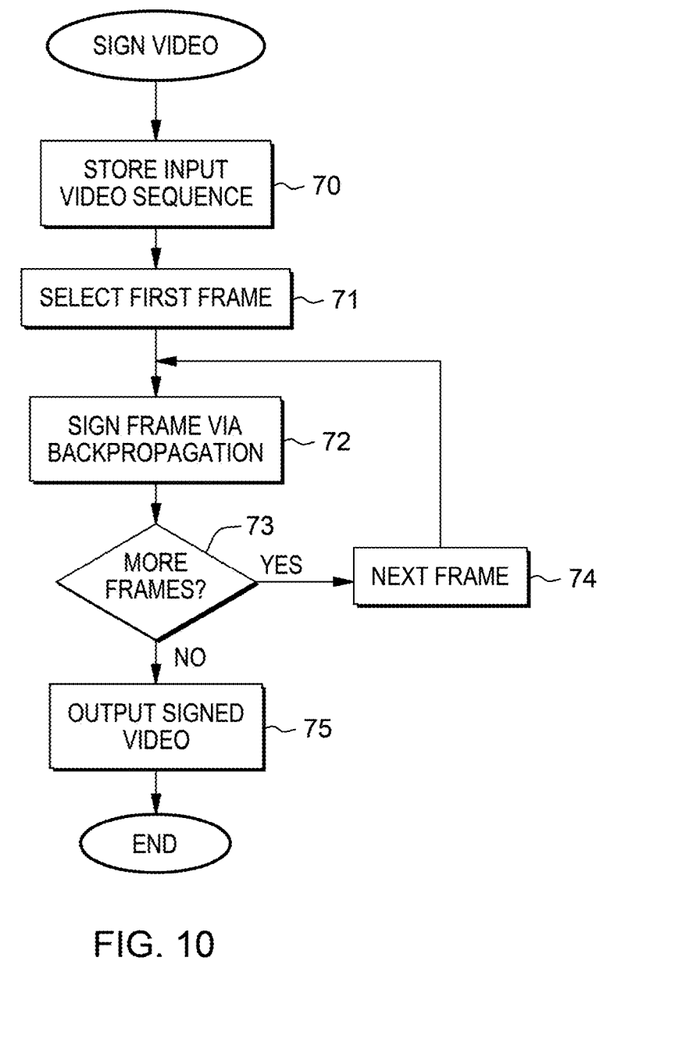
FIG. 10 illustrates the operation of an embodiment for signing video sequences, consistent with some embodiments of the disclosure.

While the above examples focus on static images, some embodiments of the disclosure may be applied to other types of data, including video and audio data. FIG. 10 illustrates one method for signing video sequences, consistent with some embodiments. In this embodiment, the NN model may be trained on static images as described above. An input video sequence is stored in operation 70. In operation 71, signature module 25 may select the first frame of the sequence. This frame may be signed in operation 72 in the same manner as a static image described above. Operation 73 may check for further frames to be signed, in which case the next frame may be selected in operation 74 and the operation may be repeated. The method may thus iterate until all frames have been signed at decision operation 73. The signed video is then output in operation 75.

Some embodiments may employ aspects of the disclosure to sign audio data. In these embodiments, the NN model may be trained on audio snippets, e.g., arrays comprising a particular number of bytes of audio data. Training samples here may have various labels appropriate to audio samples, e.g., pop music, classical music, male voice, female voice, type of instrument, electronic or acoustic, tempo, sound, and so on. An input audio sequence may be signed by constructing one or more arrays, corresponding to the audio snippets used for training, from successive snippets of the sequence, and signing each snippet in turn.

While the model used in the signing processes described above may be adapted for input of a particular type of data array, e.g., a particular data format, the domain of training samples for the NN model need not otherwise correspond to that of arrays to be signed. For instance, the particular type of image content in a training dataset of images does not restrict the image content of images that can be signed by the system. Also, while the above examples focus on digital media (image, video, and audio) data, some embodiments may be applied to other types of data, for example, data coming from sensors such as light photodiodes or signals in other wavelength domains, and structured data. Training labels in these embodiments may be specific objects or dataset-specific quantities. In general, data arrays may comprise any set of data values defining a data entity to be signed.

The above techniques may be implemented, for example, as a signature service in the cloud. Such a service may be used by social media companies, whereby users of those social media companies can have their digital media (image/video/audio) files secured and certified as "trusted source" before being uploaded and published in exchange for a fee. Media companies may also use the system to create trusted publications (e.g., newspapers), where all content is certified as trusted source, or to help ensure the authenticity of material submitted by freelance correspondents or contributors. Publishers can then assert that the content information is truthful, and they can prove it. This may also provide a basis for collection and analysis of statistics on different data sources (e.g., particular newspapers or other publications), offering a measure of the "trustfulness" of publications (e.g., X % of the publications from publisher Y have been signed using the methods and/or systems described above).

Advantageously, some embodiments may provide elegant and efficient techniques both for digitally signing data arrays and for proving whether such arrays are authentic (e.g., have not been modified). Additionally, various alternatives and modifications may be made to the embodiments described. By way of example, in some embodiments, a secret NN model may be trained externally of system 20 and then stored in the system for use in the signature process. Model training functionality may then be omitted from such embodiments.

In general, where features are described herein with reference to a method embodying the disclosure, corresponding features may be provided in a system/computer program product embodying the disclosure, and vice versa.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for digitally signing arrays of digital data, the method comprising:
   providing a secret neural network model trained to classify arrays of digital data in dependence on data content of the arrays;
   signing an array of the arrays by:
      supplying the array to the secret neural network model to obtain an initial classification result; and
      effecting a modification of data in the array to change the initial classification result to a predetermined, secret classification result, the modification being effected via a backpropagation process in the secret neural network model to progressively modify the array in response to backpropagated errors dependent on a difference between a current classification result for the array and the secret classification result.

2. The method of claim 1, wherein the modification comprises a minimal modification of data in the array; and wherein the secret neural network model is trained to classify the arrays in dependence on image content thereof.

3. The method of claim 2, wherein the arrays correspond to frames of digital video and wherein the method further comprises, for each frame of the digital video:
   supplying the corresponding array to the secret neural network model to obtain an initial classification result for that frame; and
   effecting the minimal modification of data in the array to change the initial classification result for the frame to the secret classification result.

4. The method of claim 1, wherein the secret neural network model is trained to classify the arrays in dependence on audio content thereof.

5. The method of claim 1, further comprising training the secret neural network model using a secret training dataset of the arrays.

6. The method of claim 1 wherein:
   the secret neural network model is adapted to output a confidence value for classification of an array in each of a plurality of classes; and
   the secret classification result is dependent on the confidence values for at least two of the classes.

7. The method of claim 1, further comprising iterating the backpropagation process, wherein, in each of a plurality of iterations of the backpropagation process, the array is modified by modifying data for which the backpropagated errors satisfy a predetermined condition for identifying one or more largest backpropagated errors in that iteration.

8. The method of claim 7, wherein the predetermined condition identifies backpropagated errors with absolute values greater than a threshold dependent on a largest absolute error value in the iteration.

9. The method of claim 1, further comprising iterating the backpropagation process, wherein, in each of a plurality of iterations of the backpropagation process, modifications to data in the array are calculated to mitigate a loss function dependent on the difference and an overall change in the array resulting from the modifications.

10. The method of claim 1, further comprising iterating the backpropagation process, wherein, in each of a plurality of iterations of the backpropagation process, modifications to data in the array are subject to a constraint on the change in the array resulting from the modifications.

11. The method of claim 1, further comprising, in response to receipt of a previously-signed array to be authenticated:
supplying the previously-signed array to the secret neural network model to obtain a further classification result; and
comparing the further classification result to the secret classification result to determine whether the previously-signed array is authentic.

12. The method of claim 1, further comprising modifying a subset of data in the array in a predetermined manner to apply a watermark to the array.

13. The method of claim 12, further comprising modifying the subset to apply the watermark after each of a plurality of iterations of the backpropagation process.

14. The method of claim 1, further comprising storing an array identifier associated with each array signed by the method to allow subsequent identification of arrays that have been signed.

15. A computer program product for digitally signing arrays of digital data, the computer program product comprising a computer readable storage medium having program instructions embodied therein, the program instructions being executable by a computing system to cause the computing system, for each array to be signed, to:
supply the array to the secret neural network model to obtain an initial classification result; and
effect a modification of data in the array to change the initial classification result to a predetermined, secret classification result, the modification being effected via a backpropagation process in the secret neural network model to progressively modify the array in response to backpropagated errors dependent on a difference between a current classification result for the array and the secret classification result.

16. A computer program product of claim 15, wherein the modification comprises a minimal modification of data in the array; and wherein the program instructions are further executable to cause the computing system to train the neural network model using a secret training dataset of the arrays.

17. A computer program product of claim 15 wherein the neural network model is adapted to output a confidence value for classification of an array in each of a plurality of classes, the program instructions being executable such that the secret classification result is dependent on the confidence values for at least two of the classes.

18. A computer program product of claim 15, the program instructions being executable such that, in each of a plurality of iterations of the backpropagation process:
the array is modified by modifying data for which the backpropagated errors satisfy a predetermined condition for identifying the largest backpropagated errors in that iteration; and
modifications to data in the array are calculated to mitigate a loss function dependent on the difference and an overall change in the array resulting from the modifications.

19. A computer program product of claim 15, wherein the program instructions are further executable to cause the computing system, in response to receipt of a previously-signed array to be authenticated, to:
supply that array to the secret neural network model to obtain a further classification result; and
compare the further classification result to the secret classification result to determine whether the array is authentic.

20. A computing system for digitally signing predetermined arrays of digital data, the system comprising:
a secret neural network model trained to classify the predetermined arrays in dependence on data content of the arrays; and
control logic adapted, for an array to be signed, to supply the array to the secret neural network model to obtain an initial classification result; and to effect a modification of data in the array to change the initial classification result to a predetermined, secret classification result, the modification being effected via a backpropagation process in the secret neural network model to progressively modify the array in response to backpropagated errors dependent on a difference between a current classification result for the array and the secret classification result.

* * * * *